United States Patent Office 3,163,817
Patented Dec. 29, 1964

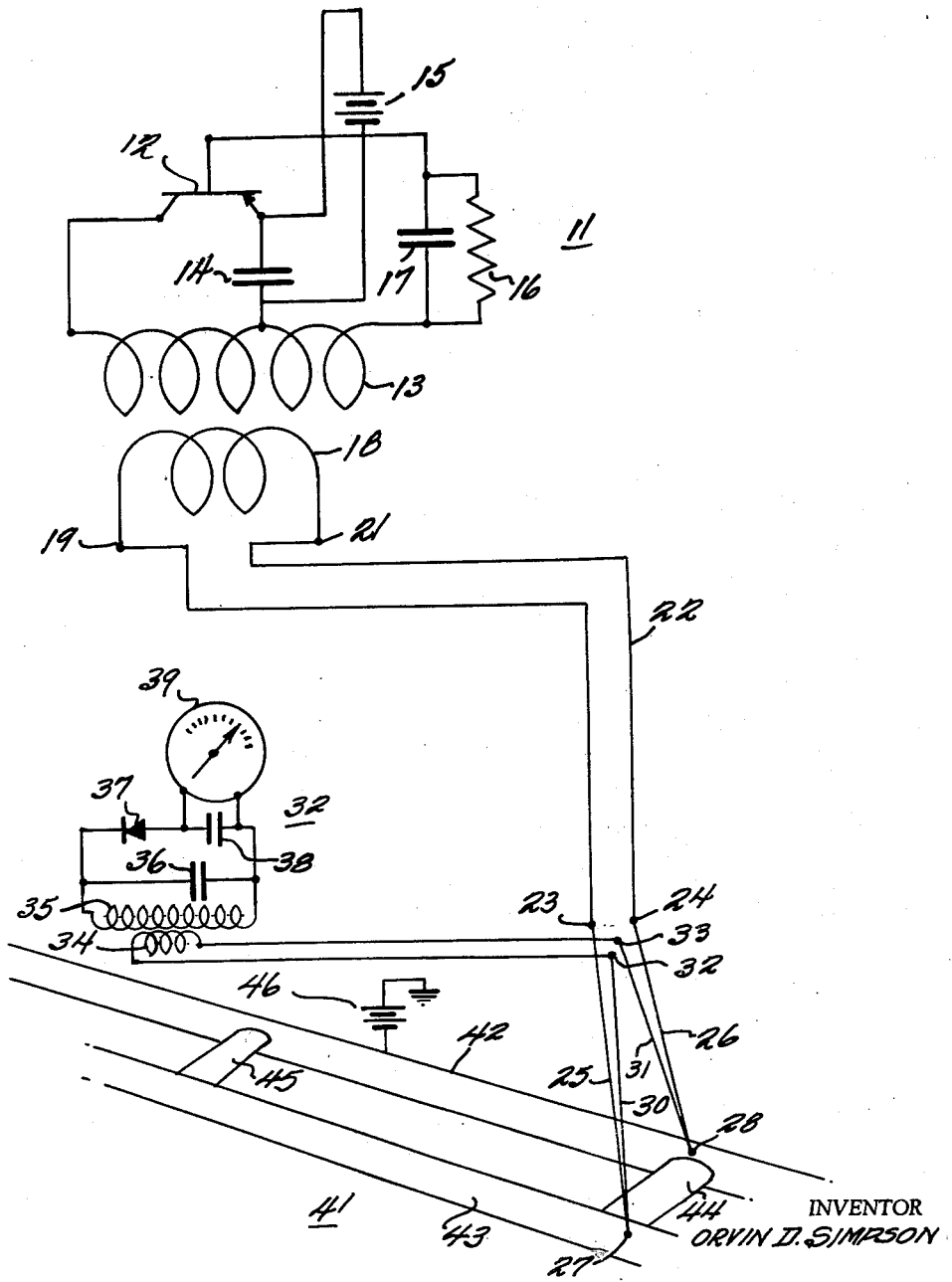

3,163,817
METHOD FOR DETECTING SHORT CIRCUITS BETWEEN INSULATED PIPE SECTIONS UTILIZING RADIO FREQUENCY SKIN EFFECT CURRENTS
Orvin D. Simpson, 815 W. Turner, Springfield, Mo.
Filed Dec. 13, 1960, Ser. No. 75,550
1 Claim. (Cl. 324—52)

The present invention relates generally to systems and methods of testing for electrical short circuits across elements of a complex low resistance network, and more particularly to systems and methods of determining the locations of electrical short circuits between adjacent pipe sections of a complex pipe system.

To prevent the corrosion of metallic gas and water pipes, that are in proximity to each other, it is common practice to insulate these from each other and to apply a negative D.C. voltage between the gase pipe lines and ground. This voltage is of sufficiently large magnitude to prevent corrosion and destruction due to electrochemical effects of the pipe to which it is connected. Respective water and gas pipe lines are electrically insulated from each other by utilizing insulated couplings. If these are defective it is also necessary to apply protective voltage to the water pipes. In addition, it is the practice to electrically insulate different sections of the same gas line from each other by means of insulated couplings. The details of the manner in which and the reasons why different pipes and pipe sections are electrically insulated are described more fully in a bulletin published by the U.S. Department of Commerce, National Bureau of Standards entitled "Corrosion in Soils;" published April 22, 1942, on pages 48 and 49.

Frequently, the various insulators become defective, or are not properly installed, causing an electrical short circuit between adjacent water and gas pipes or between adjacent normally insulated sections of the same pipe. Such short circuits are detrimental to the gas pipes, and it is important to detect their existence.

The D.C. resistance of metallic water and gas pipes is so small that it is virtually impossible, with known measuring apparatus, to accurately determine where adjacent pipes are short circuited together. This problem is further compounded since other pipes frequently interconnect with the pipes under study, thus forming additional short circuits which the measuring equipment is unable to distinguish from a short circuit of interest, i.e., around an insulator. Thus, in order to determine the location of short circuits in adjacent pipes, it is frequently necessary to remove the pipe and its insulation and to visually inspect the suspected area or to make measurements on the pipe in isolated condition. These operations are quite costly and time consuming.

Accordingly, it is an object of this invention to provide new and improved apparatus for determining the existence and location of a short circuit between normally insulated pipes in situ.

It is an additional object of this invention to provide a new and improved method and apparatus for determining the existence and location of short circuits between pipes wherein it is not necessary electrically to isolate any parts of the pipe structure from the pipe line; which is inexpensive in both cost and operation; and which is simple to utilize.

The basic concept on which the present invention is based involves the substitution of radio frequency energy for direct current energy in the measurement of very small D.C. resistances associated with extensive structures having considerable R.F. "skin effect" resistance, but very small D.C. resistance, in that the small D.C. resistance of interest can be effectively electrically isolated from the associated structure for purpose of test, without requiring physical isolation.

In utilizing the basic concept of the present invention in combination with a complex pipe arrangement having a plurality of possible areas which may be short circuited together and wherein the direct current resistance between all of these areas may be virtually negligible, a radio frequency voltage is applied between normally insulated, adjacent portions of the pipe network. The skin effect of the pipes where radio frequency voltage is applied thereto results in a substantial resistance to R.F. current flow. This produces a substantial radio frequency voltage between adjacent insulated points to which the R.F. voltage is applied that may easily be measured. If, however, a D.C. short circuit occurs directly between the pipe sections to which the R.F. voltage is applied, the radio frequency resistance is quite small causing a small R.F. potential difference between the normally insulated points. In this manner the location of a short circuit between normally insulated sections of a complex pipe system may be easily determined.

The above and still further objects, features and advantages of the present invention will become apparent upon consideration of the following detailed description of one specific embodiment thereof, especially when taken in conjunction with the accompanying drawings, wherein the single figure of the drawings is a schematic diagram of a preferred apparatus constructed according to the present invention, and which exemplifies the method of the invention.

A radio frequency oscillator 11 for producing electromagnetic signals of approximately 1500 kilocycles per second comprises P-N-P transistor 12 having one end of a primary winding 13 connected to its collector. A tap on coil 13 is connected to the emitter of transistor 12 by way of capacitor 14. Collector to emitter power is provided by battery 15 connected directly across capacitor 14 so that the collector is negatively biased with respect to the emitter. The other end of coil 13 is connected to the base of transistor 12 by way of a biasing circuit comprising the parallel combination of resistor 16 and capacitor 17. The frequency at which circuit 11 oscillates is controlled by the relative values of capacitor 14, primary winding 13 and the coupling between the two sections of the primary winding.

Secondary winding 18, having a pair of output terminals 19 and 21, is coupled to primary winding 13 and feeds the signal produced by oscillator 11, to leads or transmission line 22, which extend to terminals 23, 24. Flexible test leads 25 and 26, respectively, connect terminals 23 and 24 to test terminals 27 and 28, and flexible return leads 30, 31 extend parallel to leads 25, 26, respectively, to terminals 32, 33 adjacent to terminals 23, 24. Thereby the voltage available at terminals 32, 33 closely approximates the voltage at terminals 23, 24 regardless of the length, separation and relative configurations of leads 25, 30 and 26, 31.

A detector circuit 32, tuned to the same frequency as generated by oscillator 11 has opposite ends of an input coil 34 connected to test terminals 32 and 33. The length of the leads between coil 34 and terminals 32 and 33 should be maintained as short as possible so that the input voltage to the detector circuit is an accurate indication of the voltage between the test terminals. Coil 35 is mounted in proximity to coil 34 and serves as the secondary winding of a step up transformer. Capacitor 36 serves to tune coil 35, which it is connected across, to the same frequency as generated by oscillator 11. The opposite ends of winding 35 are connected to the series combination of diode 37 and capacitor 38, which rectify the radio frequency signal applied to coil 35 into a D.C. voltage. A suitable meter 39, e.g., a 50 microammeter, for determining the D.C. voltage across capacitor 38 is employed to indicate the R.F. voltage between terminals 32 and 33.

For utilizing this apparatus with a pipe system 41, located under ground and comprising gas pipe line 42 and water pipe line 43, electrodes 27 and 28 are respectively connected across insulator 44 employed to permit pipes 42 and 43 to be mounted in close proximity without short circuits therebetween. Negative D.C. voltage is applied between gas pipe 42 and ground by battery 46. The magnitude of the potential applied to pipe 42 must be sufficient to overcome electrochemical corrosive effects between the gas pipe line and the soil in which it is situated.

Pipes 42 and 43 are constructed of a highly electrically conductive material, such as steel, that has virtually infinitesimal resistance to direct current but which contains a substantial resistance to radio frequency voltages, such as generated by oscillator 11. The high frequency resistance is due to skin effect of the metallic conductors 42 and 43.

Thus, if insulator 44 is faulty, direct current and R.F. short circuits exist between pipes 42 and 43, at the points normally insulated by element 44. Accordingly, the R.F. voltage between electrodes 27 and 28 is virtually zero causing substantially no deflection of the movement of meter 39. In this manner, it may be easily determined that insulator 44 is faulty and needs replacement. If, however, insulator 45 is faulty and electrodes 27 and 28 remain across insulator 44, which is now considered as properly functioning, a substantial R.F. skin effect impedance along pipes 42 and 43 between insulators 44 and 45 results because of the increased conductor length between the electrodes. This produces a considerable R.F. voltage between electrodes 27 and 28 that is fed to detector circuit 32 causing substantial deflection of the needle of meter 39.

While a simple two pipe system has been specifically illustrated it is to be understood that the invention is normally utilized in conjunction with a complex pipe system having many different branches and insulators of which the illustrated structure may be a segment.

It will also be understood that the instrument may have utility in other fields. For instance, the meter can be used to check the expected life of a dry cell battery by measuring its radio frequency resistance. If the materials contained in the battery are deteriorated to any extent, the meter will determine this without using any current from the battery, thus reducing its life during test.

It should now be apparent that there has herein been disclosed a method and apparatus for indicating the presence and location of electrical short circuits, and particularly for determining short circuits between pipes by "skin effect" measurement. This structure does not require that the pipe be removed to determine the condition of its insulation and is economical in both initial cost and use.

While I have described and illustrated one specific embodiment of my invention, it will be clear that variations of the details of construction which are specifically illustrated and described may be resorted to without departing from the true spirit and scope of the invention as defined in the appended claim.

What I claim is:

A method for determining an electrical short circuit between adjacent, underground electrically conducting pipe sections normally insulated from each other by an insulating section, one of said pipe sections being connected to a D.C. source to prevent electro-chemical corrosive effects between it and the surrounding soil, comprising generating R.F. power with a source of sufficiently high frequency to cause substantial skin effect currents to flow in said pipe sections, applying a portion of said power between said sections by connecting one of a pair of leads between a terminal of said source and a first point on one of said pipe sections immediately adjacent said insulating section and by connecting the other of said pair of leads between the second terminal of said source and a second point on the other of said pipe sections immediately adjacent said insulating section, and detecting with a meter only the R.F. potential at said frequency between said points by connecting one terminal of said meter to said first point via a first lead and by connecting the other meter terminal to said second point via another lead, said potential being relatively large when said sections are insulated through said insulating section and relatively small when said pipe sections are short circuited together.

References Cited in the file of this patent

UNITED STATES PATENTS

| | | |
|---|---|---|
| 894,886 | Herrick | Aug. 4, 1908 |
| 957,020 | West | May 3, 1910 |
| 1,765,715 | Byers | June 24, 1930 |
| 2,201,472 | Browder et al. | May 21, 1940 |
| 2,358,462 | Mahren | Sept. 19, 1944 |
| 2,485,881 | Helin | Oct. 25, 1949 |
| 2,651,021 | Hays | Sept. 1, 1953 |
| 2,752,579 | Caldwell et al. | June 26, 1956 |